US012394345B2

(12) United States Patent
Ryu et al.

(10) Patent No.: US 12,394,345 B2
(45) Date of Patent: Aug. 19, 2025

(54) CONTENT-AWARE DYNAMIC POWER CONVERTER SWITCHING FOR POWER OPTIMIZATION

(71) Applicant: Apple Inc., Cupertino, CA (US)

(72) Inventors: Jie Won Ryu, San Jose, CA (US); Ardra Singh, San Francisco, CA (US); Arthur L Spence, San Jose, CA (US); Christopher P Tann, San Jose, CA (US); Chun Lu, San Jose, CA (US); Daniel J Drusch, Appleton, WI (US); Hyunwoo Nho, Palo Alto, CA (US); Jongyup Lim, San Jose, CA (US); Kingsuk Brahma, Mountain View, CA (US); Marc J DeVincentis, Palo Alto, CA (US); Mohammad Ali Jangda, Santa Clara, CA (US); Paolo Sacchetto, Cupertino, CA (US); Peter F Holland, Los Gatos, CA (US); Shawn P Hurley, Sunnyvale, CA (US); Wei H Yao, Palo Alto, CA (US); Yue Jack Chu, Cupertino, CA (US); Zhe Hua, San Jose, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 18/212,710

(22) Filed: Jun. 21, 2023

(65) Prior Publication Data

US 2024/0013692 A1 Jan. 11, 2024

Related U.S. Application Data

(60) Provisional application No. 63/359,563, filed on Jul. 8, 2022.

(51) Int. Cl.
*G09G 3/20* (2006.01)

(52) U.S. Cl.
CPC ......... *G09G 3/20* (2013.01); *G09G 2320/103* (2013.01); *G09G 2330/021* (2013.01); *G09G 2360/16* (2013.01)

(58) Field of Classification Search
None
See application file for complete search history.

(56) References Cited

U.S. PATENT DOCUMENTS 7,301,534 B2 11/2007 Runolinna
7,567,245 B2 7/2009 Mamata
8,493,370 B2 7/2013 Gettemy
9,129,549 B2 9/2015 Bell
(Continued)

*Primary Examiner* — Nicholas J Lee
(74) *Attorney, Agent, or Firm* — Fletcher Yoder, P.C.

(57) ABSTRACT

To reduce overall power consumption for an electronic display power management integrated circuit (PMIC), one of multiple electric power converters and/or electric power regulators may be selected based on an electrical load (e.g., due to the total brightness of the content displayed) on the electronic display at a given moment. In some embodiments, the PMIC may include a less efficient heavy load converter designed with high-current handling capability and a more efficient light load (e.g., low current) converter with lower current handling capability. A controller may dynamically select between the converters depending on a present load or an expected load on the electronic display.

20 Claims, 8 Drawing Sheets

(56) References Cited

U.S. PATENT DOCUMENTS

| | | | | |
|---|---|---|---|---|
| 9,330,606 | B2 | 5/2016 | Barnhoefer | |
| 10,546,524 | B2 | 1/2020 | Bell | |
| 10,909,905 | B2 | 2/2021 | Choi | |
| 11,037,494 | B1 * | 6/2021 | Chang | G09G 3/22 |
| 2008/0037289 | A1 | 2/2008 | Yang | |
| 2010/0165667 | A1 | 7/2010 | Artusi | |
| 2012/0133634 | A1 * | 5/2012 | Her | H03F 1/0211 345/212 |
| 2012/0249574 | A1 * | 10/2012 | Botzas | G09G 3/20 345/589 |
| 2019/0086992 | A1 | 3/2019 | Lin | |

* cited by examiner

CONTENT-AWARE DYNAMIC POWER CONVERTER SWITCHING FOR POWER OPTIMIZATION

CROSS-REFERENCE TO RELATED APPLICATIONS

This application claims priority to U.S. Provisional Application No. 63/359,563, filed Jul. 8, 2022, entitled "CONTENT-AWARE DYNAMIC POWER CONVERTER SWITCHING FOR POWER OPTIMIZATION," the disclosure of which is incorporated by reference in its entirety for all purposes.

SUMMARY

This disclosure relates to switching between electric power converters for an electronic display based on content that is to be displayed on the electronic display to reduce power consumption.

Numerous electronic devices—including televisions, portable phones, computers, wearable devices, vehicle dashboards, virtual-reality glasses, and more—display images on an electronic display. Certain electronic displays may have pixels that emit light in pulses. The total amount of light emitted in the pulses may be integrated by the human eye over time to produce the perception of a seamless image on the electronic display. An electronic device that houses such an electronic display may power the electronic display with a power source (e.g., a power source controlled by a power management integrated circuit (PMIC)). The power source may provide the electrical power that is used to produce the pulses of light emitted via the pixels.

Electronic displays may display a wide variety of content at a wide range of brightness values. For example, under bright ambient conditions, a global brightness value may be set very high and the electronic display may display content at a very high brightness level so the content can be seen. Under dark ambient conditions, the global brightness value may be set much lower and the electronic display may display content at a much lower brightness level. Displaying brighter content consumes more power than displaying darker content. To ensure that the electronic display has enough power to operate at both high and low brightness levels, a power management integrated circuit (PMIC) may use an electric power converter that provides a sufficiently high current regardless of the brightness of the content being displayed on the electronic display.

To reduce power consumption while displaying content at lower brightness levels, the PMIC may have multiple different electric power converters and/or electric power regulators sized to provide different levels of current corresponding to the total brightness of the content to be displayed on the electronic display. For example, to display brighter content, the PMIC may use a lower-efficiency, higher-power converter (e.g., a buck-boost converter) to ensure that enough current is provided for light emission. To display darker content where a higher current would be excessive, the PMIC may use a higher-efficiency, lower-power converter (e.g., a low dropout (LDO) converter). In the case where darker content is being displayed, the lower-power converter may provide sufficient current but may consume much less power. The PMIC may switch between the two converters based on a variety of factors, such as a current mode of the electronic device in which the electronic display is housed, a current application program running on the electronic device, and the total brightness of the content.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
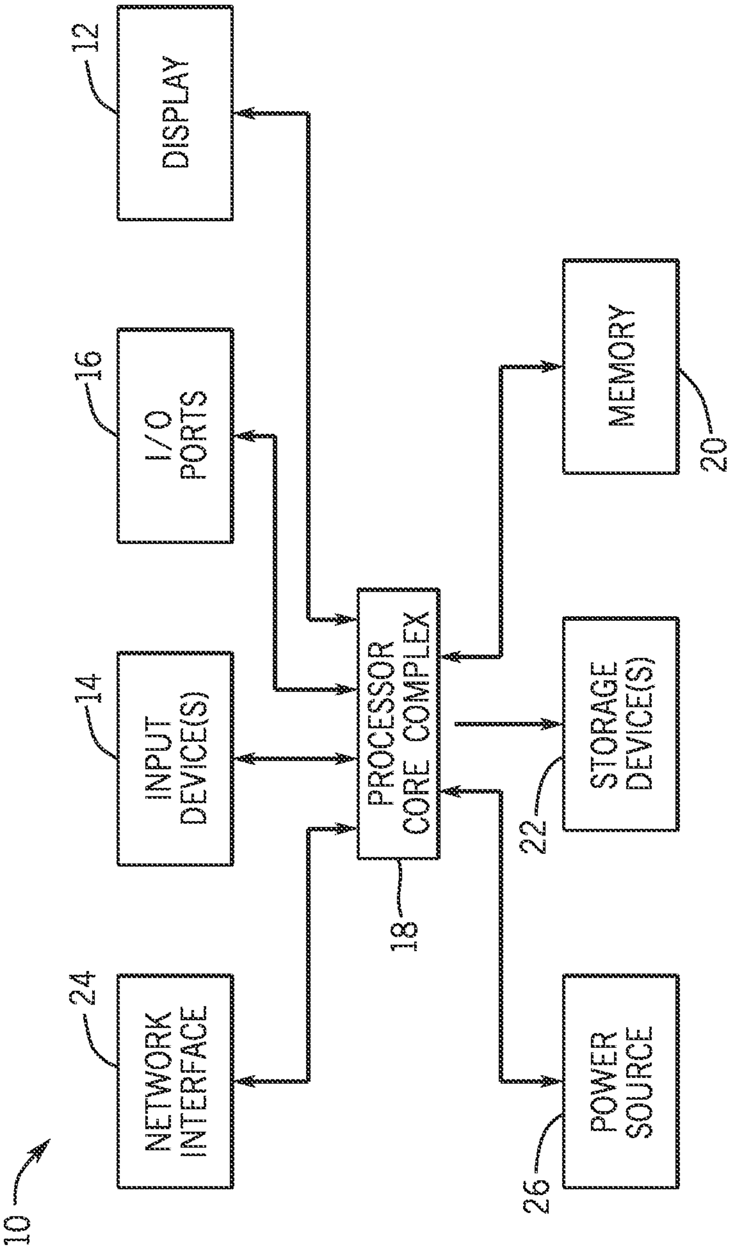
FIG. 1 is a block diagram of an electronic device including an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

To reduce overall power consumption for an electronic display PMIC, one of multiple electric power converters (e.g., a direct current-to-direct current (DC/DC) converter) and/or electric power regulators may be selected based on an electrical load (e.g., due to the total brightness of the content displayed) on the electronic display at a given moment. In some embodiments, the PMIC may include a heavy load (e.g., high current) converter designed with high-current handling capability that may be relatively inefficient and a light load (e.g., low current) converter designed to be more efficient but with lower current handling capability.

The electronic device may dynamically select between the converters (e.g., via the PMIC, via a processor) depending on a present load or on an expected load on the electronic display. For example, if bright content is displayed or is anticipated to be displayed on the electronic display, the PMIC may select the heavy load converter (e.g., a buck-boost converter). However, if dim content is displayed or is anticipated to be displayed on the electronic display, the PMIC may select the light load converter (e.g., a low-dropout (LDO) converter). In this way, the PMIC and multiple converters may enable seamless switching between the heavy load operation and the light load operation without restricting user activity with regard to content or brightness.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, or the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable gate arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with an array of display pixels. Each display pixel may represent a sub-pixel that controls the luminance of a color component (e.g., red, green, or blue).

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18. Moreover, in some embodiments, the electronic device 10 may include multiple electronic displays 12.

Figure 2:
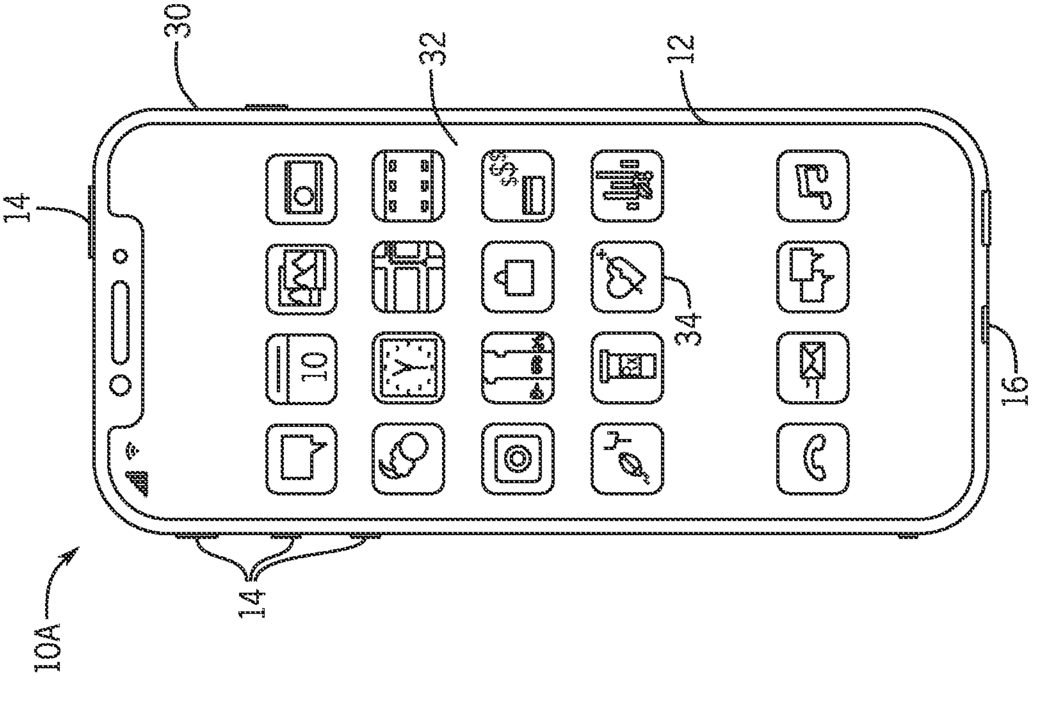
FIG. 2 is an example of the electronic device of FIG. 1 in the form of a handheld device, in accordance with an embodiment.

The electronic device 10 may be any suitable electronic device. One example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30.

Figure 3:
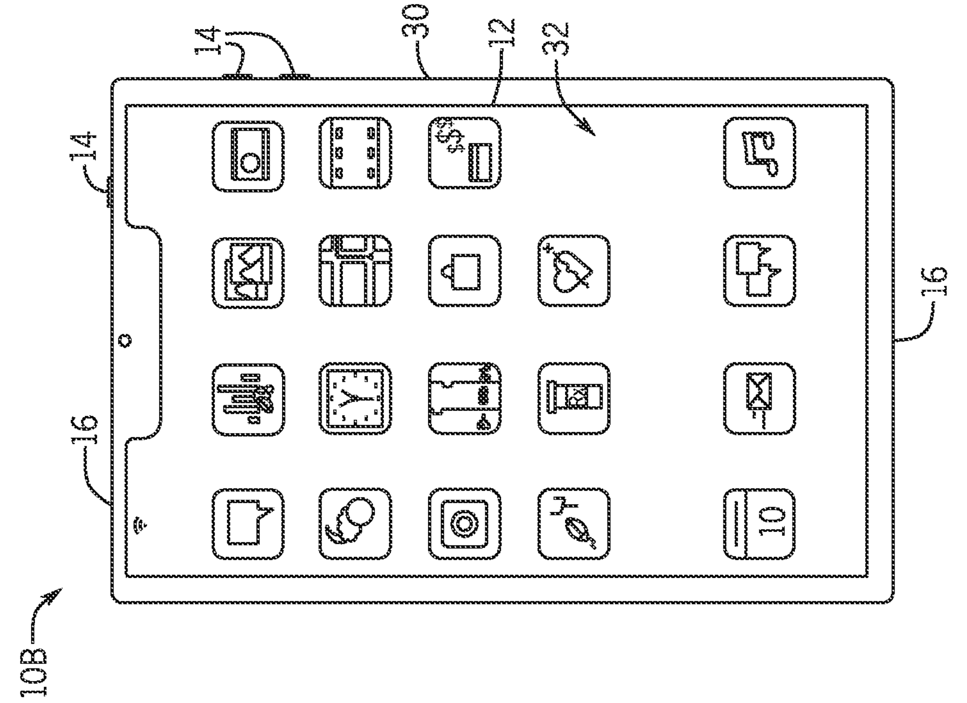
FIG. 3 is another example of the electronic device of FIG. 1 in the form of a tablet device, in accordance with an embodiment.
Figure 4:
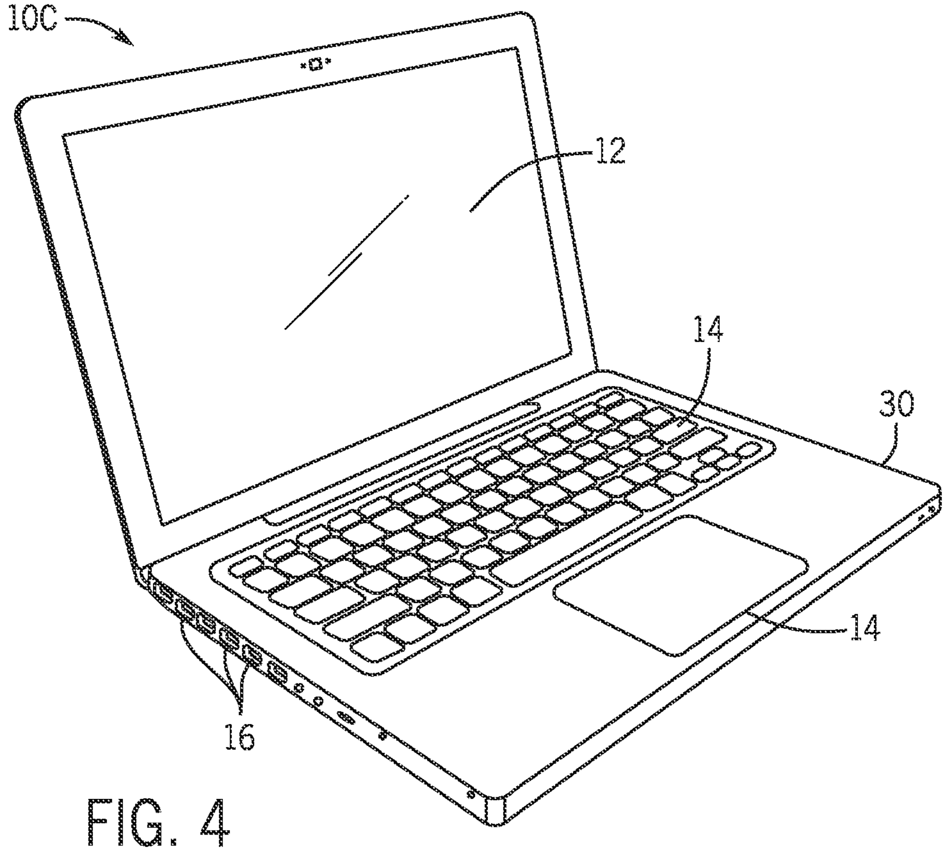
FIG. 4 is another example of the electronic device of FIG. 1 in the form of a notebook computer, in accordance with an embodiment.
Figure 5:
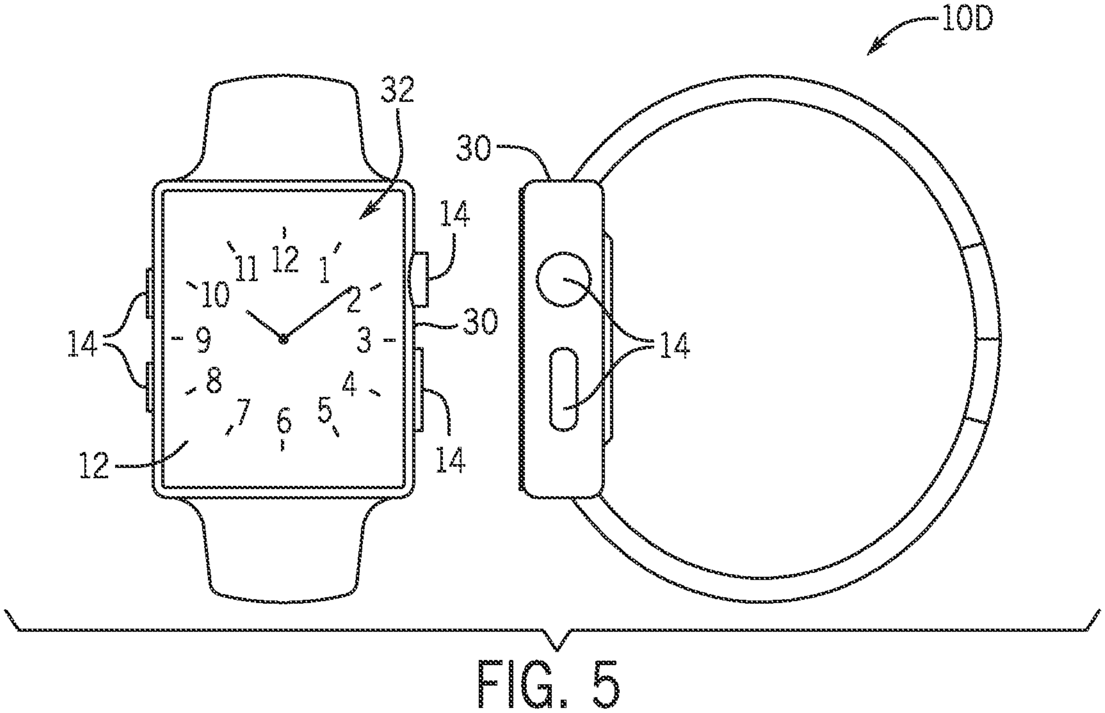
FIG. 5 is another example of the electronic device of FIG. 1 in the form of a wearable device, in accordance with an embodiment.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30.

Figure 6:
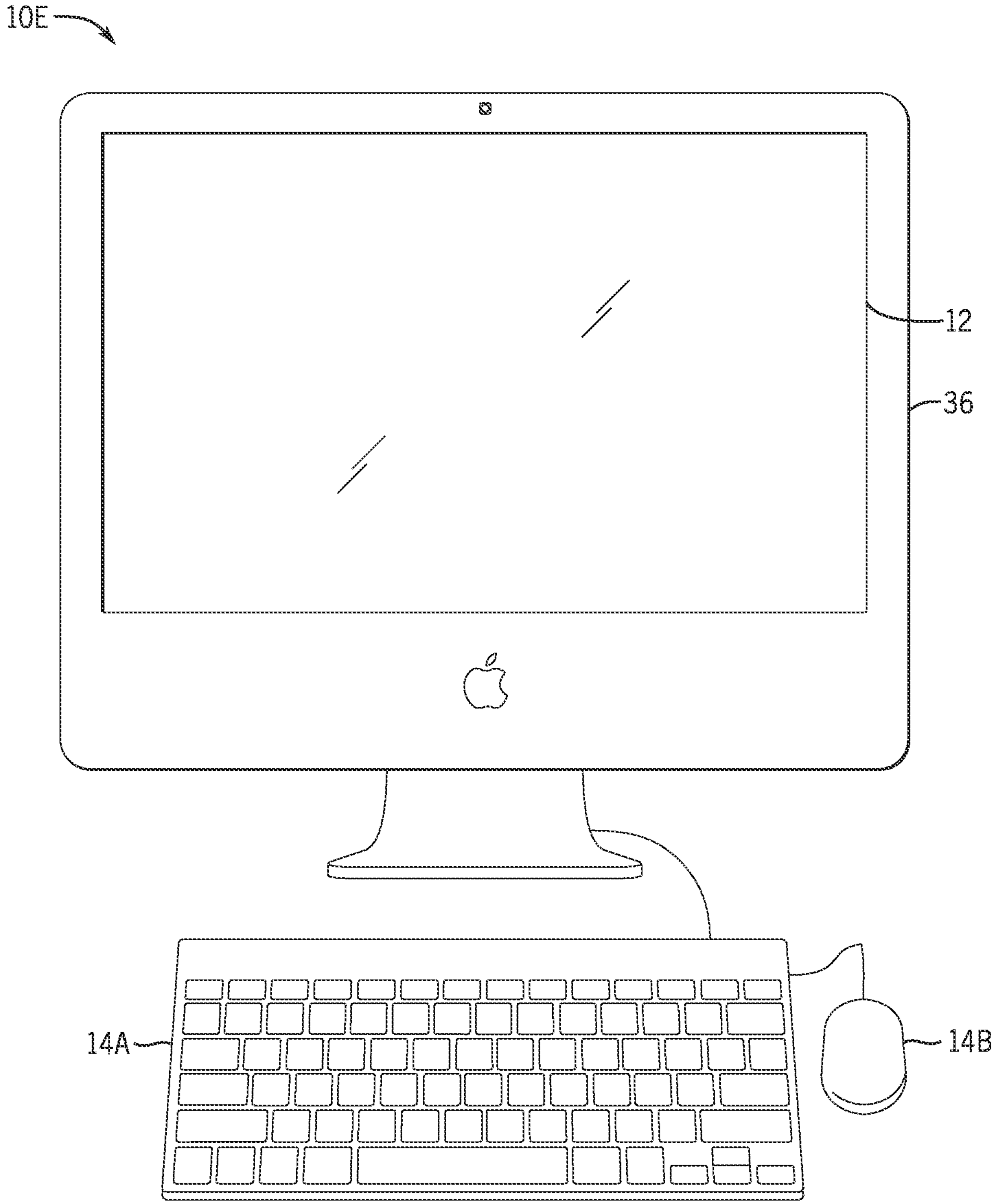
FIG. 6 is another example of the electronic device of FIG. 1 in the form of a front view of a desktop computer, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., the input structures 14), which may connect to the computer 10E.

Figure 7:
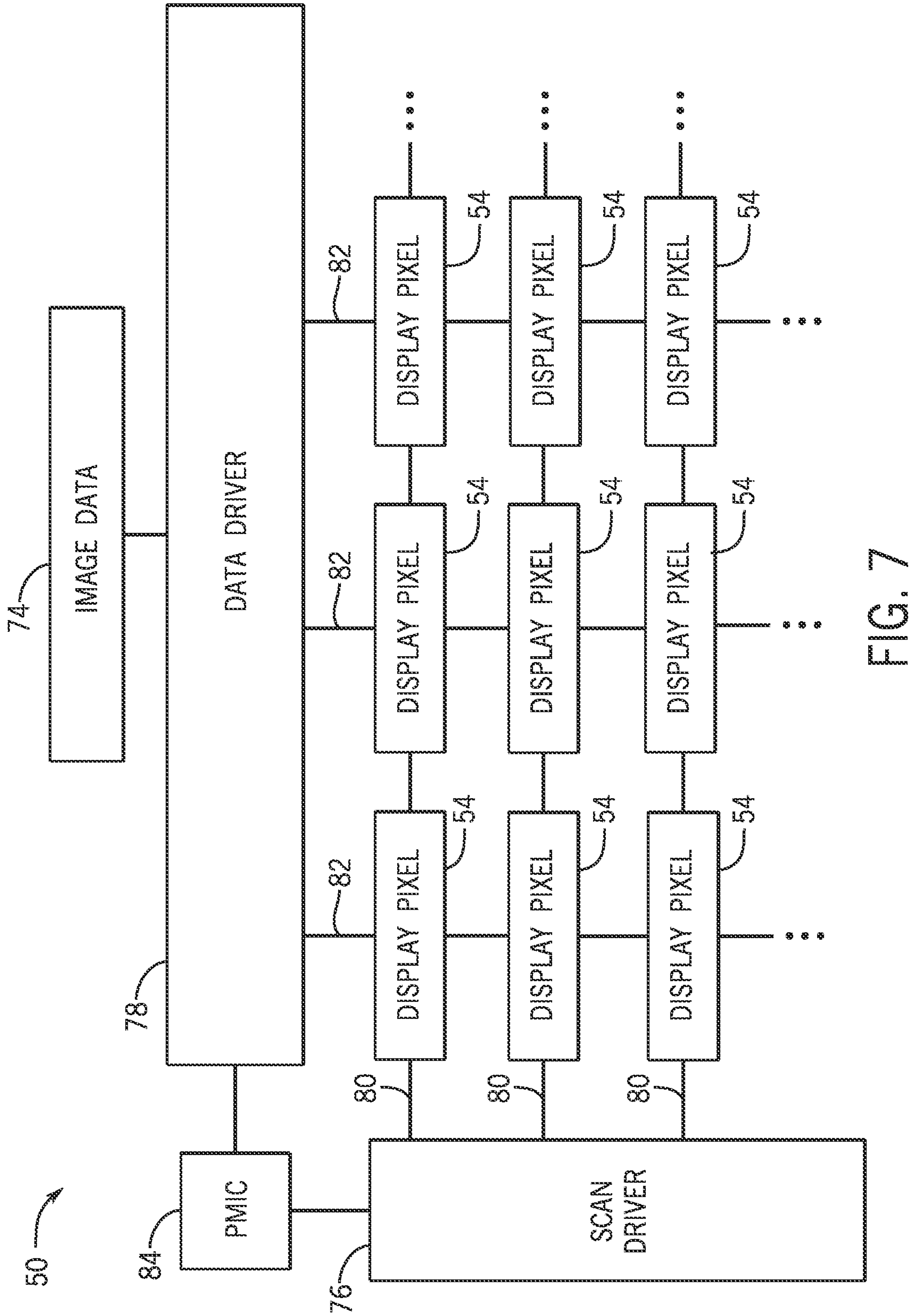
FIG. 7 is a block diagram of a display pixel array of the electronic display, in accordance with an embodiment.

FIG. 7 is a block diagram of a display pixel array 50 of the electronic display 12. It should be understood that, in an actual implementation, additional or fewer components may be included in the display pixel array 50. The electronic display 12 may receive any suitable image data for presentation on the electronic display 12. The electronic display 12 includes display driver circuitry that includes scan driver circuitry 76 and data driver circuitry 78. The display driver circuitry controls programing the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)); however, other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress, emission (EM)) on scan lines 80 to control the display pixels 54 by row. For example, the scan driver circuitry 76 may cause a row of the display pixels 54 to become enabled to receive a portion of the image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row. When the scan driver circuitry 76 provides an emission signal to certain display pixels 54, those display pixels 54 may emit light according to the image data 74 with which those display pixels 54 were programmed.

The display pixel array 50 includes a power management integrated circuit (PMIC) 84. The PMIC 84 may provide power to the display pixel array 50 (e.g., to the data driver circuitry 78 and the scan driver circuitry 76). As will be discussed in greater detail below, the PMIC 84 may receive the image data 74 and adjust (e.g., via a controller of the PMIC 84) the power delivered to the display pixel array 50 based on the image data 74.

Figure 8:
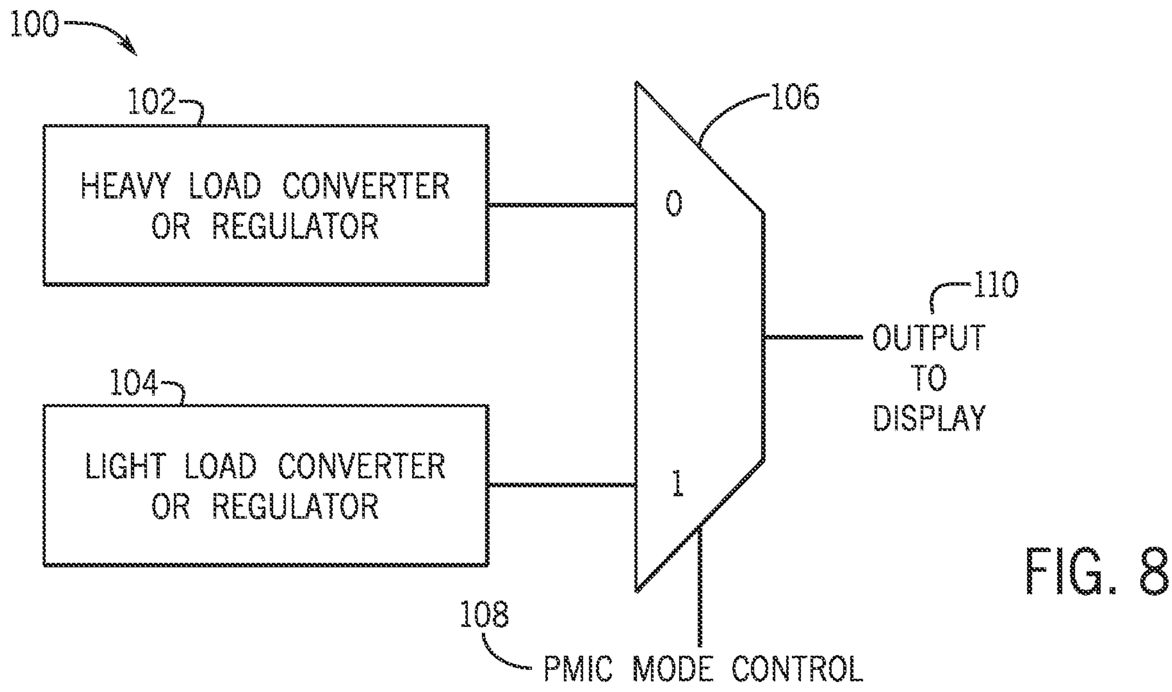
FIG. 8 is a schematic diagram of a switching circuit for toggling between a high current DC/DC converter (e.g., a heavy load converter) and a light load high efficiency electric power converter (e.g., a light load converter), in accordance with an embodiment.

FIG. 8 is a schematic diagram of a switching circuit 100 for toggling between a lower-efficiency high current DC/DC converter (heavy load converter) 102 and a light load high efficiency converter (light load converter) 104 or regulator, according to embodiments of the present disclosure. The switching circuit 100 may include selection circuitry such as a multiplexer 106. The multiplexer 106 may receive a PMIC mode control signal 108 from a controller (e.g., from the PMIC 84, from the processor core complex 18, and so on). Based on the PMIC mode control signal 108, the multiplexer 106 may either activate the heavy load converter 102 or the light load converter 104. The heavy load converter 102 may include a converter with high current handling capabilities but low operating efficiency (e.g., a buck-boost converter), while the light load converter 104 may include a converter with lower current handling capability but high operating efficiency (e.g., a low-dropout (LDO) converter). Upon selection, the switching circuit 100 may output an output power signal 110 supplied by the heavy load converter 102 or the light load converter 104.

Figure 9:
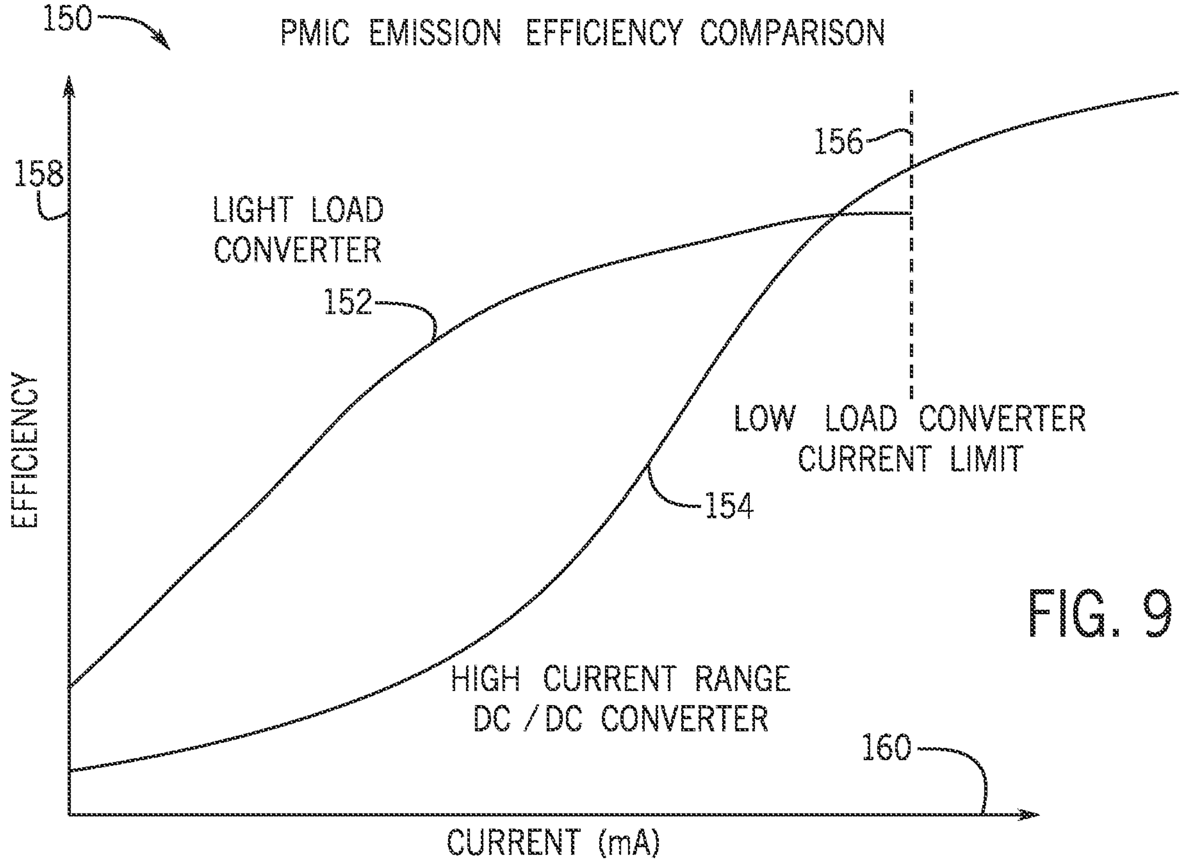
FIG. 9 is a diagram illustrating the operating behavior of the light load converter and the heavy load converter, in accordance with an embodiment.

FIG. 9 is a diagram 150 illustrating the operating behavior of the light load converter 104 and the heavy load converter 102, according to embodiments of the present disclosure. The diagram includes curve 152 representing the efficiency of the light load converter 104 (represented by the y-axis 158) as a function of the present load (represented by the x-axis 160) of the electronic display 12. The diagram includes curve 154 representing the efficiency of the heavy load converter 102 as a function of the present load of the electronic display 12. As may be observed from the diagram, the light load converter 104 operates at a higher efficiency than the heavy load converter at lower present loads. Accordingly, during lower present load applications (e.g., low-power mode, such as an always-on display mode), the controller may activate the light load converter 104 to reduce overall display power consumption.

As the present load on the electronic display 12 increases toward a light load converter current limit 156, however, the controller may deactivate the light load converter 104 (if activated) and activate the heavy load converter 102 to meet the power demands of the electronic display 12 during high current operation (e.g., video streaming) and prevent the light load converter 104 from exceeding its power limit and potentially collapsing the power supply, causing display panel shutoff or front-of-screen issues that may negatively impact user experience. Indeed, the controller may deactivate the light load converter 104 (if activated) and activate the heavy load converter 102 at a lower current to ensure that sufficient power may be provided when a higher current is to be provided. For example, the controller may deactivate the light load converter 104 (if activated) and activate the heavy load converter 102 if the current that is to be drawn reaches or is approaching a crossover point between the curves 152 and 154.

Figure 10:
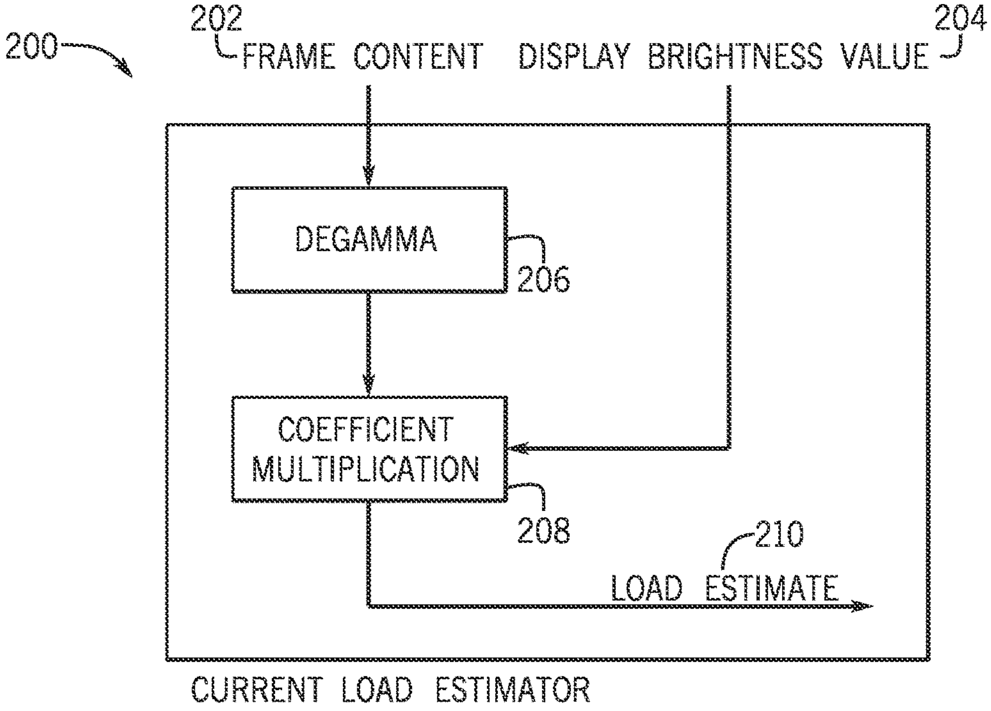
FIG. 10 is a flow diagram illustrating how a controller determines a present load on the electronic display, in accordance with an embodiment.

The controller may determine the extent of the load on the electronic display 12 based on content that is currently or is anticipated to be displayed on the electronic display 12 and/or based on the display brightness value (DBV) of the electronic device 10. FIG. 10 is a flow diagram 200 illustrating how the controller determines the present load on the electronic display 12, according to embodiments of the present disclosure. The controller may receive frame content 202 (e.g., the image data for a given frame) and the display brightness value (DBV) 204 for the electronic display 12. The controller may use the frame content 202 to determine the present load as the present load on a display PMIC (e.g., 84) may be based on content being displayed on the electronic display 12 at a given moment. Thus, the controller may use the frame content 202 to determine the brightness at which the display pixels 54 may emit light to display the frame content 202, which will determine the load on the PMIC 84. The controller may transmit the frame content 202 to a degamma block 206 (e.g., gamma decoding circuitry or a gamma decoding operation) to convert the frame content 202 from the gamma domain (e.g., from a gray value of 0 to 255) to a domain that accurately represents the power (e.g., current) that may be supplied to the display pixels 54 to display the frame content 202 as intended.

To accurately determine the present load, the controller may take into account the individual brightness values of the pixel emissions on the electronic display 12 (e.g., ascertained from the frame content 202) scaled to the global brightness value of the electronic display 12 itself (e.g., the DBV 204). The controller may multiply the gamma decoded signal by a coefficient corresponding to the DBV 204 in multiplication circuitry 208 to obtain a load estimate 210 for the electronic display 12.

Figure 11:
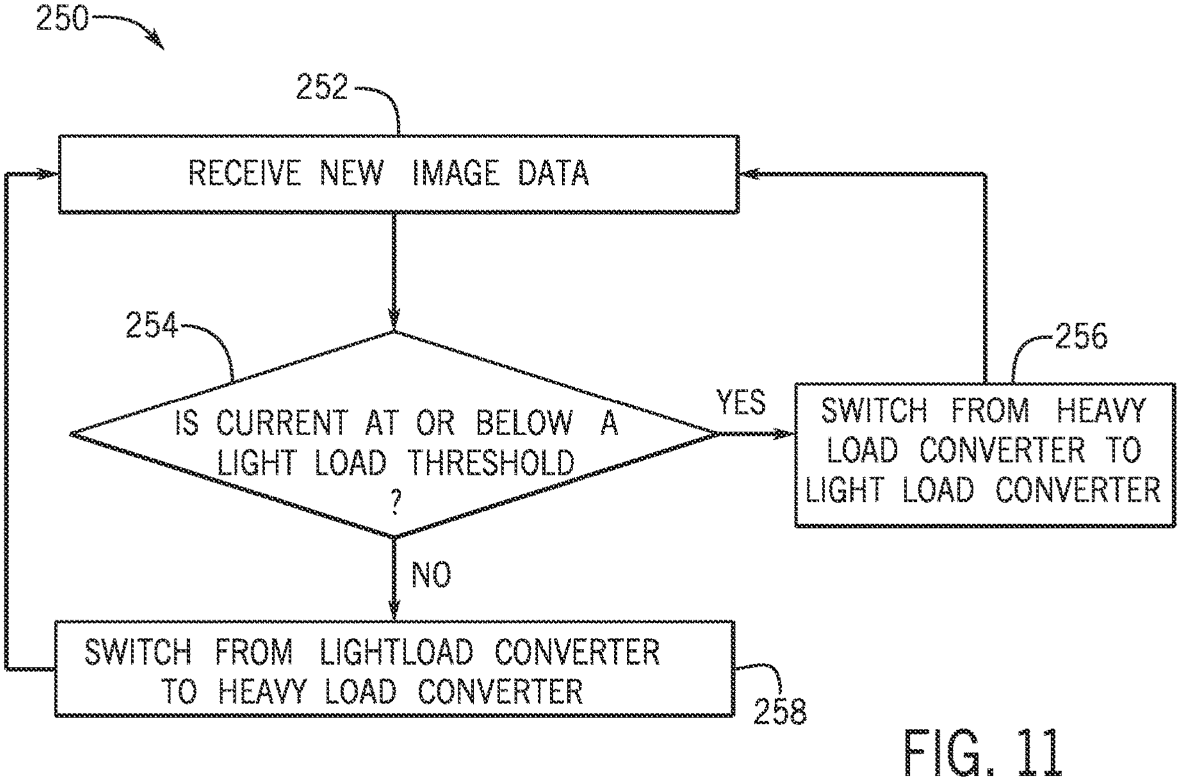
FIG. 11 is a flowchart of a method for determining the present load on the electronic display and determining whether to activate the low load converter or the high load converter, in accordance with an embodiment.

FIG. 11 is a flowchart of a method 250 for determining the present load on the electronic display 12 and determining whether to activate the light load converter 104 or the heavy load converter 102, according to embodiments of the present disclosure. Any suitable device (e.g., a controller) that may control components of the electronic device 10, such as the processor core complex 18 or the PMIC 84, may perform the method 250. In some embodiments, the method 250 may be implemented by executing instructions stored in a tangible, non-transitory, computer-readable medium, such as the memory 20 or storage 22, using the processor core complex 18. For example, the method 250 may be performed at least in part by one or more software components, such as an operating system of the electronic device 10, one or more software applications of the electronic device 10, and the like. While the method 250 is described using steps in a specific sequence, it should be understood that the present disclosure contemplates that the described steps may be performed in different sequences than the sequence illustrated, and certain described steps may be skipped or not performed altogether.

In process block 252, the controller may receive new image data 74 (e.g., the frame content 202). In query block 254, the controller may determine the present load on the electronic display 12 based at least in part on the image data 74 and the DBV 204 of the electronic display 12 and determine whether the present load is at or below a light load threshold (e.g., the light load converter current limit 156, an efficiency crossover point, a lower value of current selected to provide margin to avoid possibly drawing excessive current from the light load converter 104). The threshold may be set based on brightness of the frame content 202 being displayed on the electronic display 12 (e.g., as both a function of the frame content 202 itself and the DBV 204 of the electronic display 12).

If the controller determines that the present load is at or below a light load threshold, in process block 256 the controller switches from operating the heavy load converter 102 and activates the light load converter 104 (e.g., by sending the PMIC mode control signal 108 indicating a command to select the light load converter 104). However, if the controller determines that the present load exceeds the light load threshold, in process block 258 the controller switches from the light load converter 104 and activates the heavy load converter 102 (e.g., by sending the PMIC mode control signal 108 indicating a command to select the heavy load converter 102). In this manner, the controller may determine the present load currently experienced on the electronic display 12 or anticipated to be experienced on the electronic display 12 and select the appropriate converter or regulator accordingly.

In some embodiments, method 250 may be performed at each new frame. However, if the new image data 74 is the same as the previous image data 74 (e.g., there is no change to the frame content 202) the controller may forego performing the method 250 until new image data 74 associated with different frame content 202 is received to further conserve power. In some embodiments, the controller may have a default preference for the heavy load converter 102 (e.g., to ensure that the light load converter 104 is not overloaded). For example, if new frame content 202 is being received (e.g., frame content 202 is changing with each new frame), the controller may activate the heavy load converter 102 until new frame content 202 received is the same as the previous frame content, at which time the controller will perform the method 250. By doing so, the controller may prevent overloading the light load converter 104 in the event that new incoming frame content 202 draws more power than the light load converter 104 may supply. It should be noted that, while only two converters are discussed, there may be any appropriate number of converters that may be implemented on the PMIC 84 (e.g., three converters or more, four converters or more, five converters or more).

As previously mentioned, using the light load converter 104 when current drawn by the electronic display 12 exceeds the power limit of the light load converter 104 may result in collapse of the power supply. To prevent power supply collapse, the display panel may be prevented from drawing current above the light load threshold (e.g., current threshold, average pixel current equivalent threshold, and so on). Current control systems (e.g., a real-time peak luminance control (RTPLC) system) may determine current or APCE at each frame displayed on the electronic display 12. However, determining current or APCE for each frame may in some cases be insufficient for preventing the light load converter 104 from exceeding its limit, as peak current draw may occur while a new frame is being programmed onto the display panel. However, as will be discussed in greater detail below, exceeding the limit of the light load converter 104 may be prevented by only using the light load converter 104 when the content displayed on the electronic display 12 is static.

Figure 12:
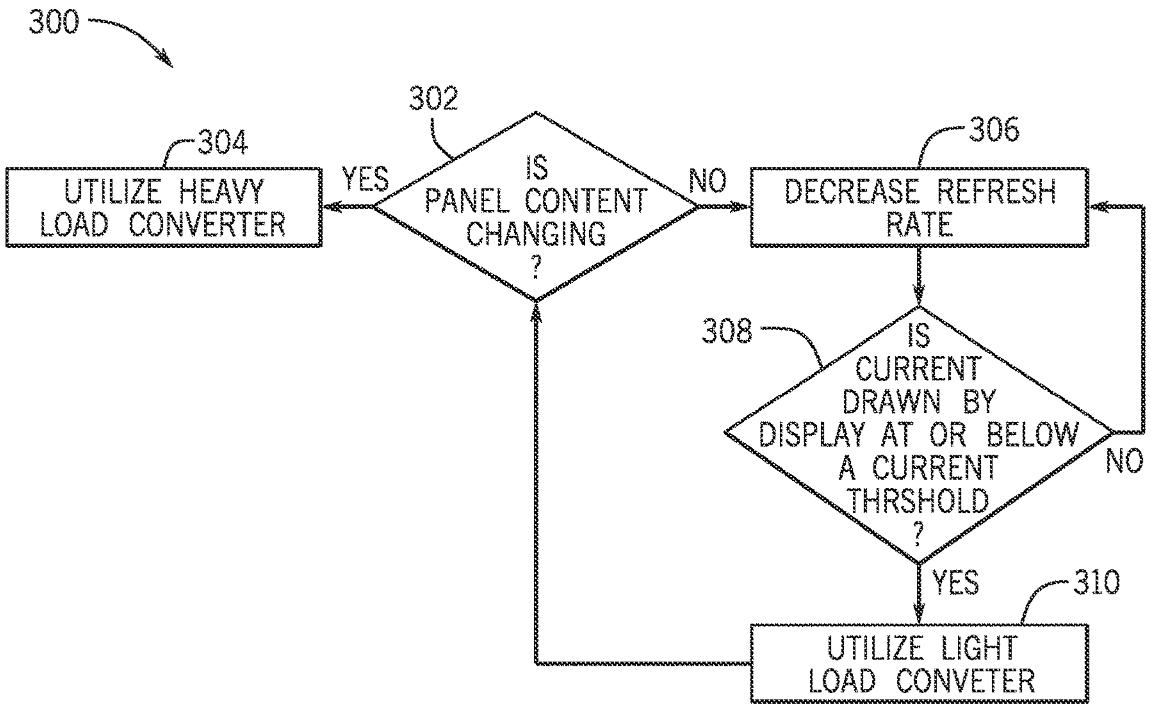
FIG. 12 is a flowchart of a method for determining the present load on the electronic display and determining whether to activate the light load converter or the heavy load converter based on whether the content displayed on the electronic display is changing or static, according to embodiments of the present disclosure.

FIG. 12 is a flowchart of a method 300 for determining the present load on the electronic display 12 and determining whether to activate the light load converter 104 or the heavy load converter 102 based on whether the content displayed on the electronic display 12 is changing or static, according to embodiments of the present disclosure. Any suitable device (e.g., a controller) that may control components of the electronic device 10, such as the processor core complex 18 or the PMIC 84, may perform the method 300. In some embodiments, the method 300 may be implemented by executing instructions stored in a tangible, non-transitory, computer-readable medium, such as the memory 20 or storage 22, using the processor core complex 18. For example, the method 300 may be performed at least in part by one or more software components, such as an operating system of the electronic device 10, one or more software applications of the electronic device 10, and the like. While the method 300 is described using steps in a specific sequence, it should be understood that the present disclosure contemplates that the described steps may be performed in different sequences than the sequence illustrated, and certain described steps may be skipped or not performed altogether.

In query block 302, the controller may determine whether content displayed on the electronic display 12 is presently dynamically changing (e.g., an animated frame) based on presently displayed frames or if an upcoming frame will be dynamically changing based on anticipated upcoming frames. If the controller determines that the content is presently dynamically changing or will by dynamically changing in upcoming frames, in process block 304, the controller may cause the electronic display to utilize the heavy load converter 102. If the controller determines that the content is not changing (e.g., the frames are repeating frames such that the content displayed is a static image), the controller may, in process block 306, gradually decrease (e.g., walk down) refresh rate of the electronic display 12 until a minimum refresh rate is reached. Once a first frame having the minimum refresh rate is reached, the controller may use a current control system (e.g., RTPLC system) to determine an APCE of the first minimum refresh rate frame to determine if the brightness of the display panel is at or a below a brightness threshold. In some embodiments, the first refresh rate frame may be written back to memory within a system-on-a-chip (SOC) so that replay can be utilized. If there is sufficient confidence that lookup tables (LUTs) below a certain refresh rate will not cause an increase in APCE, changing from the heavy load converter 102 to the light load converter 104 may occur once a temporal pixel modification block has acquiesced.

Current draw of the electronic display 12 may be determined based on the APCE for the first minimum refresh rate frame and a panel brightness value to determine if the current drawn is at or below a threshold value. In query block 308, the controller may determine if the current drawn by the electronic display 12 is at or below a current threshold. If the controller determines that the current drawn by the electronic display 12 is not at or below the current threshold, the controller may cause the electronic display 12 to continue to decrease luminance in the process block 306. If the controller determines that the current drawn by the electronic display 12 is at or below the current threshold, in process block 310, the controller may cause the electronic display to utilize the light load converter 104, which may cause the electronic display 12 to operate in a low-luminance mode and may reduce the power consumed by the electronic display 12. The controller may iteratively perform the method 300 at every frame to determine if the electronic display 12 is displaying dynamic content or static content, and may continue using the light load converter 104 until immediately prior to the next dynamic frame (e.g., non-replay frame), at which time the controller may cause the electronic display 12 to utilize the heavy load converter 102. In this manner, the method 300 may enable determining the present load on the electronic display 12 and determining whether to activate the light load converter 104 or the heavy load converter 102 based on whether the content displayed on the electronic display 12 is changing or static.

Figure 13:
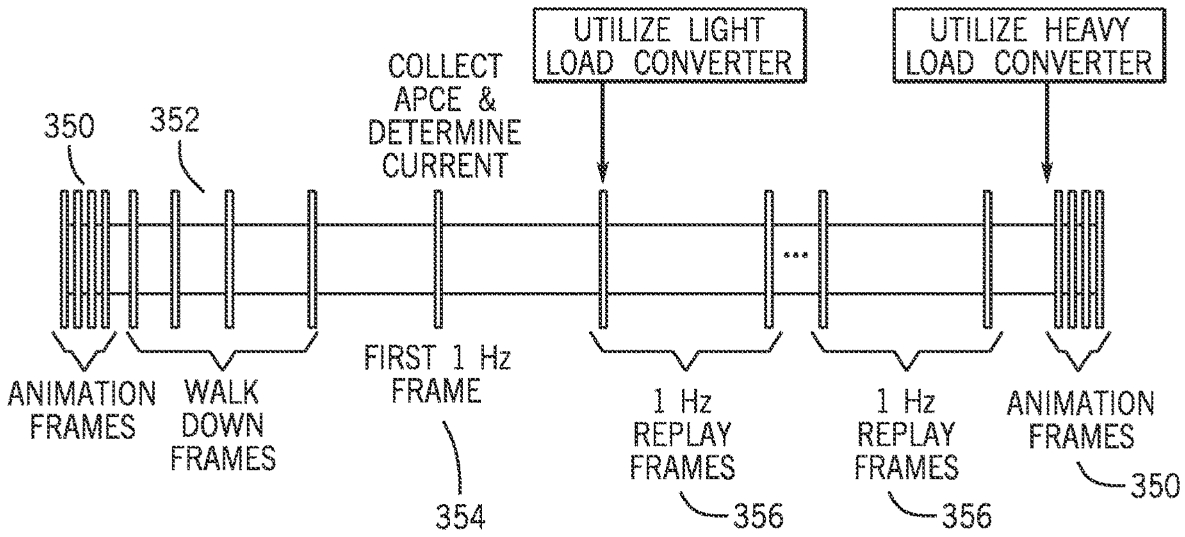
FIG. 13 is an illustration of when the controller may switch from the light load converter to the heavy load converter based on the content displayed on the electronic display, according to embodiments of the present disclosure.

FIG. 13 is an illustration of when the controller may switch from the light load converter to the heavy load converter based on the content displayed on the electronic display, according to embodiments of the present disclosure. During animation frames 350 (e.g., dynamic frames) the controller may select (e.g., via the PMIC mode control signal 108) the heavy load converter 102 to ensure that the PMIC 84 can safely provide the amount of current needed for displaying the animation frames 350. During walk down frames 352, the content displayed may remain static (e.g., the content displayed may be a still image), and the controller may cause the refresh rate of the electronic display 12 to be gradually reduced or walked down to a minimum refresh rate. The minimum refresh rate may be selected as any appropriate or desirable minimum refresh rate, such as 1 hertz (Hz) or more, 2 Hz or more, 10 Hz or more, 50 Hz or more, and so on.

Frame 354 represents the first frame where the minimum refresh rate (e.g., 1 Hz) is reached. At the frame 354, the controller may use a current control system (e.g., an RTPLC system) to determine the APCE of the frame 354 to determine if the current drawn by the electronic display 12 during the frame 354 is at or below a given threshold current. If the controller determines that the APCE of the frame 354 is not at or below the given threshold, the controller will refrain from taking action, and the PMIC 84 will continue to use the heavy load converter 102. However, if the controller determines that the current is at or below the given threshold, the controller may select (e.g., via the PMIC mode control signal 108) the light load converter 104 to supply the current for the electronic display 12, saving power during display during the minimum refresh rate frames 356 (e.g., replay frames). The electronic display 12 may continue to utilize the light load converter 104 until immediately prior to the next animation frames 350 (e.g., next non-replay frames) to ensure that the PMIC 84 can supply sufficient current for the more power hungry animation frames 350.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A power management integrated circuit, comprising:

a first electric power converter;

a second electric power converter;

selection circuitry coupled to the first electric power converter and the second electric power converter, the selection circuitry configured to toggle between activating the first electric power converter and the second electric power converter; and a controller configured to determine a load on the power management integrated circuit based on gamma-decoded image data and a coefficient corresponding to a display brightness value and, in response to determining the load on the power management integrated circuit, send a selection signal to the selection circuitry indicating a selection of the first electric power converter or the second electric power converter.

2. The power management integrated circuit of claim 1, wherein the first electric power converter comprises a buck-boost electric power converter.

3. The power management integrated circuit of claim 1, wherein the second electric power converter comprises a low-dropout electric power converter.

4. The power management integrated circuit of claim 1, wherein the controller is configured to determine the load on the power management integrated circuit at least in part by receiving image data associated with frame content currently being displayed on an electronic display.

5. The power management integrated circuit of claim 1, wherein the controller is configured to determine the load on the power management integrated circuit at least in part by receiving image data associated with frame content anticipated to be displayed on an electronic display.

6. A method, comprising:

receiving, at a controller of a display power management control circuitry, image data corresponding to frame content;

determining, based on the frame content, a first frame rate at a first time and a second frame rate at a second time;

activating a first electric power converter based on the first frame rate at the first time; and activating a second electric power converter based on the second frame rate at the second time.

7. The method of claim 6, comprising determining a present load on the display power management control circuitry by performing gamma decoding on the image data.

8. The method of claim 7, wherein determining the present load on the display power management control circuitry comprises determining a coefficient based on a display brightness value and multiplying the coefficient by the gamma-decoded image data to obtain an estimate of the present load.

9. The method of claim 6, wherein activating the first electric power converter comprises transmitting a mode control signal indicating that the display power management control circuitry is entering a low-power mode.

10. The method of claim 6, wherein activating the second electric power converter comprises transmitting a mode control signal indicating that the display power management control circuitry is entering a high-power mode.

11. The method of claim 6, comprising deactivating the second electric power converter based on determining that a present load falls beneath a threshold.

12. The method of claim 6, comprising deactivating the first electric power converter based on determining that a present load exceeds a threshold.

13. A tangible, non-transitory, machine-readable medium, comprising machine-readable instructions that, when executed by one or more processors, cause one or more processors to:

determine an electrical load on a power management integrated circuit of an electronic display associated with new frame content and subsequent frame content to be displayed on the electronic display; and activate a first electric power converter based on determining that the new frame content differs from the subsequent frame content.

14. The tangible, non-transitory, machine-readable medium of claim 13, wherein determining the electrical load on the power management integrated circuit comprises, at least in part:

receiving image data associated with the frame content to be displayed on the electronic display; and performing gamma decoding on the image data.

15. The tangible, non-transitory, machine-readable medium of claim 14, wherein determining the electrical load on the power management integrated circuit comprises, at least in part:

receiving a display brightness value;

determining a coefficient associated with the display brightness value; and multiplying the coefficient and the gamma decoded image data.

16. The tangible, non-transitory, machine-readable medium of claim 13, comprising machine-readable instructions that, when executed by the one or more processors, cause the one or more processors to determine the electrical load on the power management integrated circuit at each new frame based on determining that the new frame content differs from the subsequent frame content.

17. The tangible, non-transitory, machine-readable medium of claim 13, comprising machine-readable instructions that, when executed by the one or more processors, cause the one or more processors to determine the electrical load on the power management integrated circuit based on determining that the new frame content is the same as the subsequent frame content.

18. The method of claim 6, wherein the first frame rate is lower than the second frame rate.

19. The tangible, non-transitory, machine-readable medium of claim 13, wherein the machine-readable instructions that cause the one or more processors to activate a second electric power converter based on the new frame content being the same as the subsequent frame content.

20. The tangible, non-transitory, machine-readable medium of claim 13, wherein the machine-readable instructions that cause the one or more processors to decrease a refresh rate associated with the subsequent frame content based on the new frame content being the same as the subsequent frame content.

* * * * *